US006896135B2

(12) United States Patent
Leitner

(10) Patent No.: US 6,896,135 B2
(45) **Date of Patent: *May 24, 2005**

(54) COIL STRAP WITH NAILS FOR USE IN A NAIL HAMMER

(76) Inventor: Helmut Leitner, St. Georgen Klaus 102, Waidhofen/YBBS (AT), A-3340

( * ) Notice: Subject to any disclaimer, the term of this patent is extended or adjusted under 35 U.S.C. 154(b) by 160 days.

This patent is subject to a terminal disclaimer.

(21) Appl. No.: 10/226,343

(22) Filed: Aug. 23, 2002

(65) Prior Publication Data

US 2003/0006166 A1 Jan. 9, 2003

Related U.S. Application Data

(63) Continuation-in-part of application No. 09/714,867, filed on Nov. 17, 2000, now Pat. No. 6,431,427, which is a continuation-in-part of application No. PCT/EP00/02101, filed on Mar. 10, 1999, and a continuation-in-part of application No. 09/159,647, filed on Sep. 24, 1998, now Pat. No. 6,557,703.

(30) Foreign Application Priority Data

| | | |
|---|---|---|
| Sep. 24, 1997 | (AT) | GM596/97 U |
| Jan. 15, 1998 | (AT) | GM18/98 U |
| Mar. 16, 1998 | (EP) | 98104659 |
| Mar. 18, 1999 | (AT) | 489/99 |

(51) Int. Cl.[7] .......................... B65D 85/24; F16B 15/08
(52) U.S. Cl. ........................ 206/338; 206/345; 411/442
(58) Field of Search ................................ 206/338, 339, 206/340, 341, 343–345; 411/442; 227/136, 137

(56) References Cited

U.S. PATENT DOCUMENTS

| | | | | |
|---|---|---|---|---|
| 1,123,221 A | | 1/1915 | Beckley | |
| 1,542,340 A | | 8/1925 | Crofoot | |
| 1,582,223 A | | 4/1926 | Polzer | |
| 3,083,369 A | | 4/1963 | Peterson | |
| 3,442,374 A | | 5/1969 | Hillier | |
| 3,768,124 A | | 10/1973 | Maynard | |
| 3,851,759 A | | 12/1974 | Young et al. | |
| 4,129,941 A | | 12/1978 | Zahn | |
| 4,433,782 A | | 2/1984 | Figge et al. | |
| 4,434,929 A | | 3/1984 | Keener | |
| 4,679,975 A | | 7/1987 | Leistner | |
| 4,712,676 A | | 12/1987 | Randall | |
| 5,020,663 A | | 6/1991 | Dallas et al. | |
| 5,339,983 A | | 8/1994 | Caple | |
| 5,634,582 A | | 6/1997 | Morrison, Jr. et al. | |
| 5,909,993 A | | 6/1999 | Leistner | |
| 6,027,004 A | | 2/2000 | Ramella et al. | |
| 6,431,427 B1 | * | 8/2002 | Leitner | 227/119 |
| 6,557,703 B1 | * | 5/2003 | Leitner | 206/338 |

FOREIGN PATENT DOCUMENTS

| | | |
|---|---|---|
| EP | 0 321 440 A2 | 6/1989 |
| EP | 0 321 440 B1 | 8/1992 |
| EP | 0 905 387 A2 | 3/1999 |
| WO | WO 88/08087 | 10/1988 |

* cited by examiner

*Primary Examiner*—Jila M. Mohandesi
(74) *Attorney, Agent, or Firm*—Cahn & Samuels, LLP.

(57) ABSTRACT

Coil strapped nails and a nailing device using coil strapped nails are provided. The coil may be provided with steel nails (1) having a length of 14 to 25 mm and a shaft diameter of 2 to 3 mm. The nails are held by wires (2,3) 6.5 to 7.5 mm apart, wherein the wires are preferably quenched and tempered. In the center of the coil a wrapping sleeve may be provided having due clearance for the nail heads.

12 Claims, 3 Drawing Sheets

COIL STRAP WITH NAILS FOR USE IN A NAIL HAMMER

CROSS-REFERENCE TO RELATED APPLICATIONS

The present application is a continuation-in-part of U.S. Ser. No. 09/159,647, filed Sep. 24, 1998, now U.S. Pat. No. 6,557,703, which claims the benefit of priority from Austrian patent applications GM 596/97, filed Sep. 24, 1997, and GM 18/98 filed Jan. 15, 1998, and claims the benefit of EPO 98 104 659.2, filed Mar. 16, 1998, and the present application is also a continuation-in-part of U.S. Ser. No. 09/714,867, filed Nov. 17, 2000, now U.S. Pat. No. 6,431, 427, which is a continuation-in-part of PCT/EP/02101, filed Mar. 10, 1999 and claims the benefit of Austrian patent application A489/99, filed Mar. 18, 1999, all of the preceding of which are hereby incorporated by reference in their entirety.

BACKGROUND OF THE INVENTION

1. Field of the Invention

The present invention relates to coil strapped nails, as well as nailing devices and nail coils for use in nailing devices. More particularly, the invention relates to an improved coil strap having stainless steel nails, which are integrally connected by means of at least two wires, or alternatively three wires, and also relates to nail strapped coils and nailing device using the same.

2. Description of the Related Technology

Nailing devices, which are powered by compressed air, gas, electrical energy or by hand and which use nails stored in a magazine are known in the art. Typically a nailing magazine contains up to 140 parallel-aligned nails, which are connected, e.g. welded, to each other by means of a wire at the nail shafts. As will be appreciated, the ductility of the wire permits the nail strap to be wrapped into a coil, the shape in which it is used in the nailing device.

Current designs feature connecting wires made of soft, unalloyed metals, which permit easy coiling and welding of the wire-nail connection. However, one drawback of using soft, unalloyed metals for the connecting wires is that these devices are prone to jamming. For example, with such a soft-metal design, the hammer action causes a reduction of the nail pitch during operation. Furthermore, the nails in this design are prone to incline towards the magazine center. Accordingly, when in use, repeated malfunctions of the nailing device occur.

Malfunctions may occur because the nails jam due to twisting, jam due to reduction of nail pitch, or jam from excessive inclination of the nails caused by the hammer action. As will be appreciated, these malfunctions are particularly prevalent when the nail strap is nearly used up and the remaining nail strap is unsupported inside the magazine. Accordingly, there remains a long-felt need in the art for a nail coil and device which overcomes these disadvantages.

Prior artisans have devoted extensive research to improving the connection between wire and nail shaft to lessen the unintentional reduction of nail pitch and the inclining of the nails during operation of the nailing device. However, there still remains a long-felt need in the art for a device and method which provides trouble free separation of nail and wire within the nailing device during hammer action, while simultaneously ensuring a proper wire-nail-weld.

The foregoing underscores some of the problems associated with conventional nailing devices and nail coils.

Furthermore, the foregoing highlights the need in the art for a reliable nailing device and nail coil which lessens the occurrence of malfunctions.

SUMMARY OF THE INVENTION

The present invention overcomes the aforementioned drawbacks in the art and offers new advantages as well. Accordingly, it is an object of the present invention to provide coil strapped nails which oppose twisting and/or misaligning of the nails while ensuring a reliable separation of nail from wire within the nailing device during hammer action. It is also an object of the invention to provide a nail strap coil and a nailing device configured to prevent a jamming of the nail strap during operation.

According to one aspect of the invention, in order to avoid misalignment of nails within the nailing device (and subsequent jamming of the nailing device), the connection wires comprise a quenched and tempered metal. One advantageous feature of this configuration is that the wires can be hardened, which greatly influences the ductility of the wires, while ensuring reliable positioning of the nails of the nail strap during drive-in.

According to this aspect of the invention, a presently preferred embodiment comprises a wire having a tensile strength of 500 to 900 N/mm$^2$. In a preferred configuration, a pair of connecting wires are used. In a related embodiment, the coil uses three connecting wires to hold the nails. In an alternative embodiment, stainless steel wire is used.

By manipulating the tensile strength of the wire or wires, the problem of misalignment may be solved for nails 14 to 25 mm long (and preferably having a shaft diameter of 2 to 3 mm, more preferably 2.5 mm, wherein the wires are pitched at 6.5 to 7.5 mm, preferably 7 mm, to each other). In a presently preferred embodiment, nails of about 19 mm are used. More preferably, 19 mm long nails are used with connecting wires having a tensile strength of 500 to 900 N/mm$^2$ to prevent misalignment and subsequent malfunctioning of the device.

At the predetermined nail length and pitch claimed by this invention, only a minimal deviation of the nail pitch from the desired position is possible, which prevents jamming of the nailing device. At the same time, the pitch between nails is short enough for the impact element of the nailing device to impact on both connecting points of wire to nail, thus ensuring a reliable separation of the nail from the wires.

According to a preferred embodiment, nails with heads are used. In a two-wire embodiment, the wire proximal to the head is spaced 9 to 11 mm, preferably 10 mm, from the head of the nail and connected to the nail shaft. This distance of the proximal wire to the head ensures a trouble free separation of the nail from the connecting wires. According to other embodiments of the invention, the distance of the proximal wire to the nail head is generally equal to the diameter of the nail head.

In an exemplary embodiment, the nail strap contains 65 to 85 nails, preferably 70 nails. This configuration avoids the need to change the coil too frequently when the device is in use, while simultaneously ensuring the device has a nail magazine that is of a usable size and weight. Accordingly, the only limit on the size of the coil strap is based on the desired weight of the nail strap and the desired size of the magazine.

As is known, nails are preferably inclined by 15 degrees to the vertical with the wires being in horizontal position. As described previously, quenched and tempered connecting wires are preferred, which keep the nails in a somewhat flexible position, thus avoiding malfunction. This feature is however not sufficient in all cases. Furthermore it may be necessary to use ordinary coil strapped nails without quenched and tempered wires.

In a preferred embodiment, two connecting wires are used to hold the nails. In an alternative embodiment, three wires are used.

According to the invention, it is furthermore envisaged to use a wrapping sleeve inside the coil where the outside diameter of the wrapping sleeve is identical to the inside diameter of the coil and where the cylindrical face of the wrapping sleeve is in contact with the nail shafts or wires respectively of the inner coillage, but with clearance for the nail heads. One design features a cylindrical wrapping sleeve where a distance from the magazine floor is maintained, allowing clearance for the nail heads of the inner coillage, which protrude inwards and underneath the wrapping sleeve. A different design features a wrapping sleeve with a groove suitable to accommodate the nail heads. Further features are determined by their application and can be derived from the description and drawings.

The present invention is also directed to nail strapped coils for application in such a nailing device where the coil displays the described features.

BRIEF DESCRIPTION OF THE DRAWINGS

The following drawings describe the invention wherein.

DESCRIPTION OF THE PREFERRED EMBODIMENTS

Figure 1:
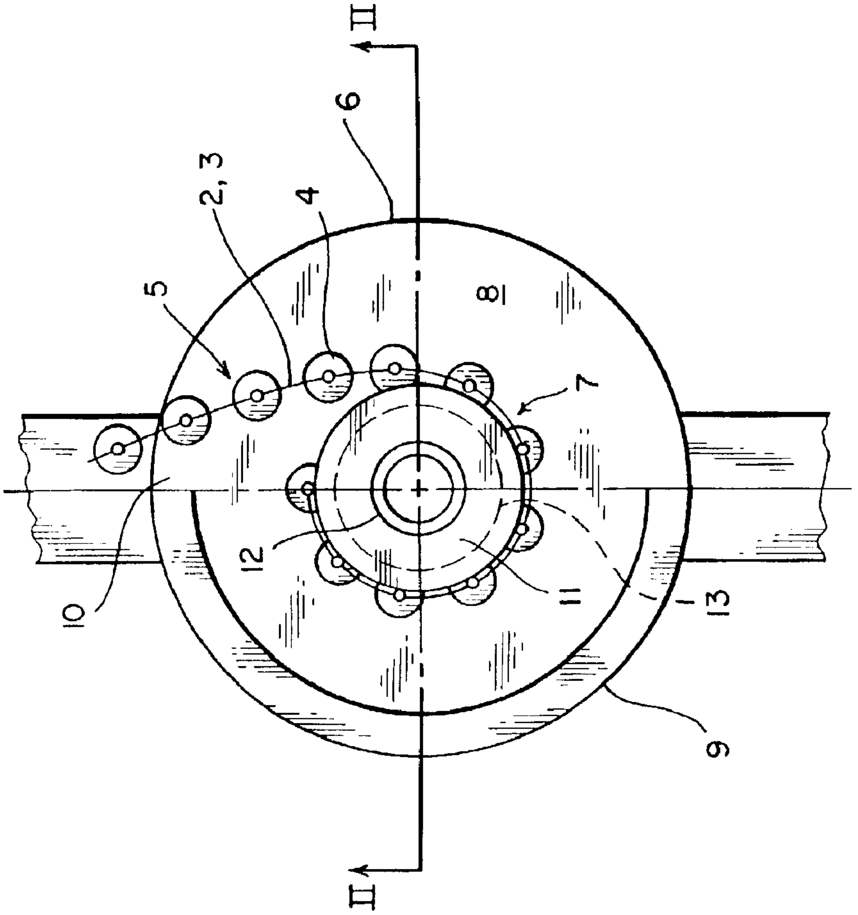
FIG. 1 is a top view of part of a nailing device according to the invention.

FIG. 1 shows a top view of a magazine of the nailing device as is applicable to EP 0 321 440. Other relevant parts of the nailing device, as well as the magazine lid, have been deleted to give a clearer picture of the present invention. In magazine (6) lies the nail strap coil. Nail strap coil consists of a series of nails which are connected by means of two wires (2,3) (or alternatively, three wires) arranged one above the other in a generally parallel configuration to form a strap.

FIG. 1 illustrates the coil in its final stage, i.e., where most of the nails have been used up. In this embodiment, the magazine floor is identified as 8. The magazine wall (9) extends over one half of the magazine. The magazine can be closed with a lid, whereby the nail strap exits via opening (10) towards the hammerhead (not shown). According to an aspect of the invention, a wrapping sleeve (11) may be used. In a preferred embodiment, the wrapping sleeve (11) and coil (7) combination is fitted on stub (12) of the magazine and allowed to rotate.

One advantageous embodiment of the wrapping sleeve features an annular groove (13) on the side facing the magazines floor (8), which allows nail heads (4) to pass. A dotted line (14) indicates the underside of the wrapping sleeve, whereas in a different design, the groove is replaced by the wrapping sleeve being developed as a cylinder and arranged in such a way that nail heads (4) come to lie underneath the wrapping sleeve, thereby allowing clearance for the nail heads.

The unwinding of the nail strap during actuation of the nailing device is in both cases guaranteed as the innermost coil is fixed in a vertical position by the cylindrical wall of the wrapping sleeve. This is true even when the coil is almost used up, as shown in FIG. 1.

Figure 2:
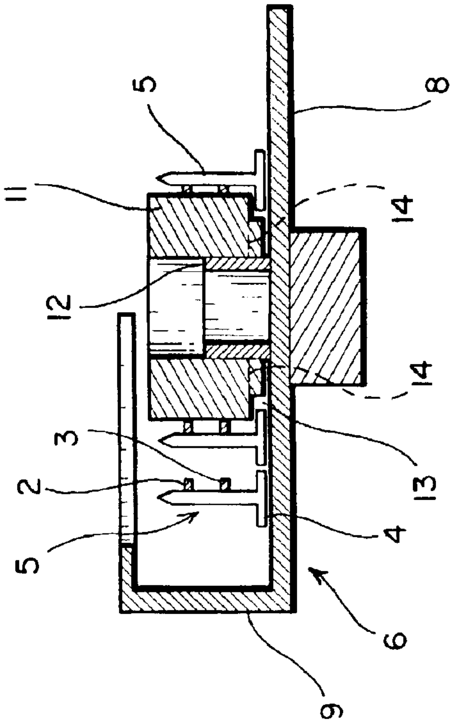
FIG. 2 is a cross-sectional view of the nailing device of FIG. 1 taken along line II—II.

FIG. 2 shows a section along line II—II in FIG. 1, where the left hand side displays an alternative position of the coil. In this case, as an alternative an annular groove (13) is cut deep enough to allow enough space for nail heads (4).

The coil strapped nails may be wrapped around the wrapping sleeve right from the beginning, whereby the coil is mounted together with the wrapping sleeve. The wrapping sleeve may be provided separately as an accessory to the nailing device, where the wrapping sleeve is fitted concentric into the prepared nail strap coil.

The height of the wrapping sleeve is equal to the height of the nail strap. In any case it is to be ensured that the nails of the inner coil position and their respective connecting wires (2,3) are resting on the cylindrical face of the wrapping sleeve.

Figure 3:
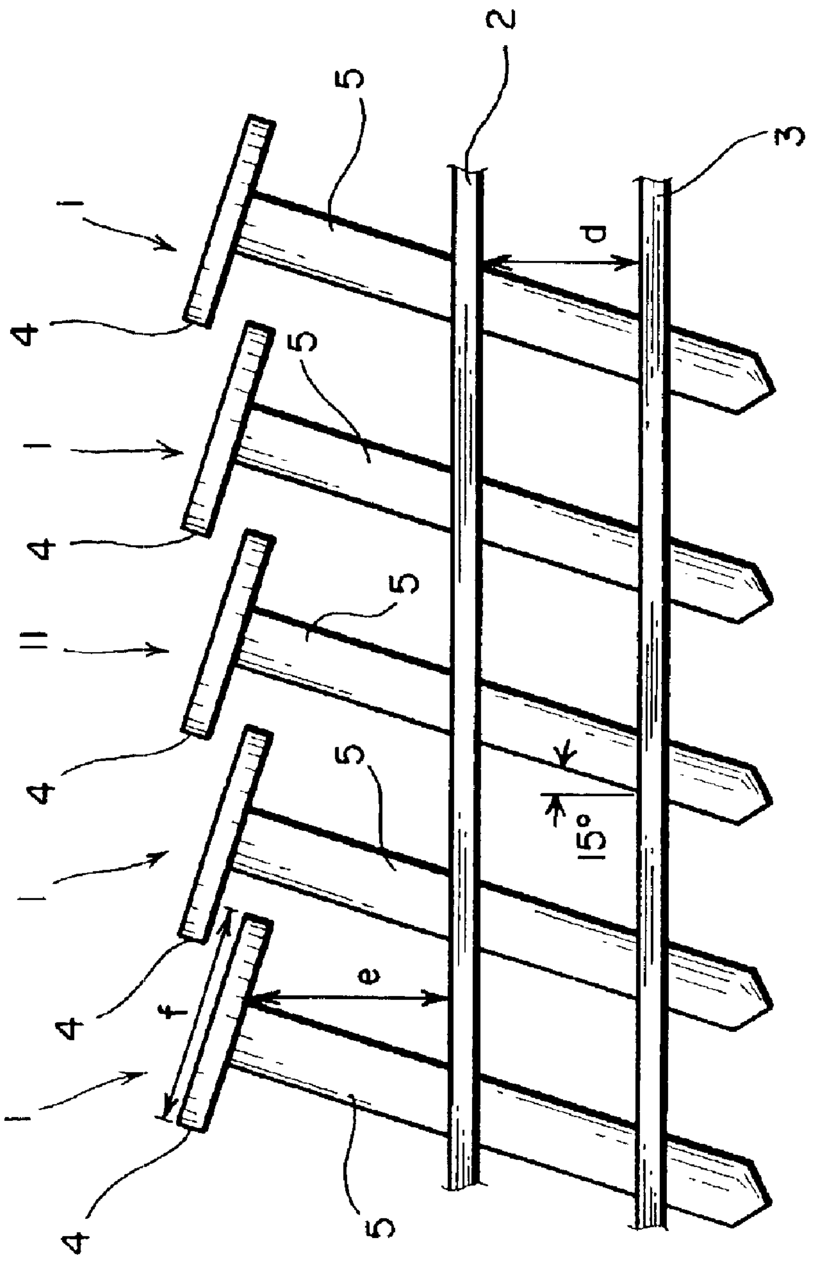
FIG. 3 is a partial side view of a two-wire embodiment of a nail strap according to the invention.

As according to FIG. 3, the nail strap has to be designed in such a way so that several nails (1) with heads (4) and shafts (5) align parallel to each other and are connected by means of two wires (2,3). Wires (2,3) are separated by pitch "d" from each other. Wire (2), which is nearer the head has the distance "e" from head (4) and nail (1), which is equal to diameter "f" of their heads (4). Shafts (5) of nails 1 are inclined by 150 degrees to the vertical, whereby wires (2,3) are horizontal. The above-mentioned measurements and ratios of measurements have, surprisingly enough, proved to be successful.

In an alternative embodiment, the wires (2,3) comprise stainless steel. Surprisingly, stainless steel has proven to advantageously allow the nail coil to operate without misalignment or malfunction.

Figure 4:
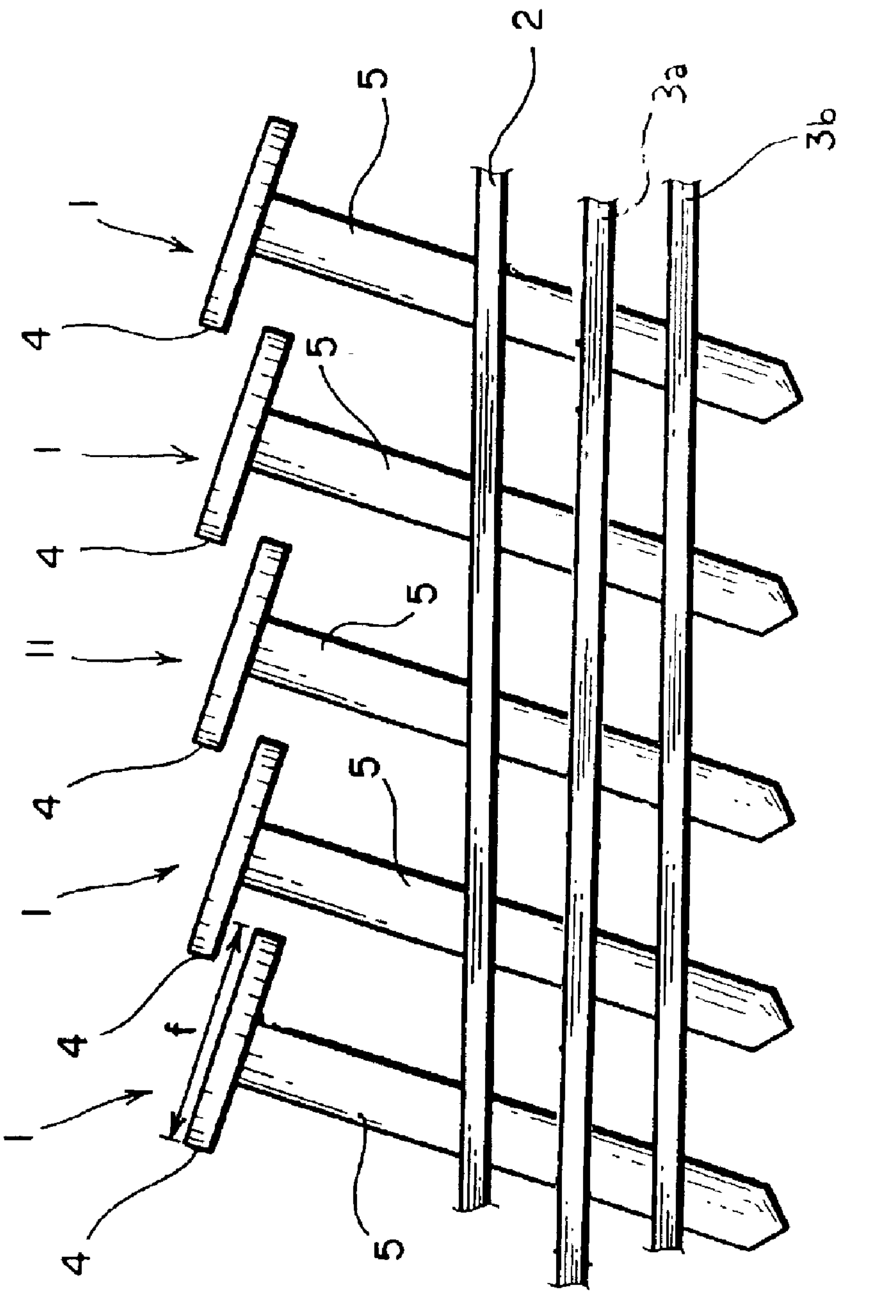
FIG. 4 is a partial side view of a three-wire embodiment of a nail strap according to the invention.

In another alternative embodiment, the wires (2,3) as depicted in FIG. 4 may include three wires **(2,3*a*,3*b*)**.

According to the invention, the connecting wires may comprise any suitable material, including but not limited to metal, alloys, plastics, etc.

If, according to one alternative metal or alloy wires are used, the wires may preferably be quenched and hardened. According to the invention the wires may have their hardness varied to limit sag and reduction of pitch. This in turn allows better control and predictability of the movement of fed nails, thus ensuring trouble free feed of the nail strap. In a presently preferred embodiment, improvement in the relevant property of metal or alloy wires may be achieved by stretching of the wires with a pulling force of from about 500 to 900 N/mm$^2$.

What is claimed is:

1. A nail coil comprising:

a plurality of generally identically shaped nails each having a head on a first end and a point on a second end, said nails having a length of from 14 to 25 mm;

a first wire having a generally uniform cross-section attached to the shafts of said nails in an area proximal said nail heads;

a second wire having a generally uniform cross-section disposed parallel to said first wire and attached to said nail shafts; wherein said wires have been quenched and hardened to a tensile strength of about 500 to 900 N/mm$^2$; and wherein said nails and wires are rolled into a coil.

2. The nail coil of claim 1, wherein said coil comprises from about 65 to 85 nails.

3. The nail coil of claim 1, wherein said coil comprises 70 nails.

4. The nail coil of claim 1, wherein said nail heads have a diameter about equal to the distance said first wire is disposed from said nail heads.

5. The nail coil of claim 1, wherein said nail length is about 19 mm.

6. A nail coil comprising:

a plurality of generally identically shaped nails each having a head on a first end and a point on a second end, said nails having a length of about 14 to 25 mm;

a first wire attached to the shafts of said nails in an area proximal said nail heads;

a second wire attached to said nail shafts;

a third wire disposed parallel to and between said first and second wires;

wherein said wires have been quenched and hardened to a tensile strength of about 500 to 900 $N/mm^2$; and wherein said nails and wires are rolled into a coil.

7. The nail coil of claim 6, wherein said nail length is about 14 to 25 mm.

8. The nail coil of claim 7, wherein said nail length is about 19 mm.

9. The nail coil of claim 6, wherein said wires have a generally uniform cross-section.

10. The nail coil of claim 6, wherein said coil comprises from about 65 to 85 nails.

11. The nail coil of claim 10, wherein said coil comprises 70 nails.

12. The nail coil of claim 6, wherein said nail heads have a diameter about equal to the distance said first wire is disposed from said nail heads.

* * * * *